(12) United States Patent
Choi et al.

(10) Patent No.: US 9,116,631 B2
(45) Date of Patent: Aug. 25, 2015

(54) MOBILE DEVICE AND METHOD OF MANAGING DATA USING SWAP THEREOF

(71) Applicant: Samsung Electronics Co., Ltd., Gyeonggi-do (KR)

(72) Inventors: JinHyuck Choi, Gyeonggi-do (KR); Il Park, Seoul (KR)

(73) Assignee: SAMSUNG ELECTRONICS CO., LTD., Suwon-Si, Gyeonggi-Do (KR)

( * ) Notice: Subject to any disclaimer, the term of this patent is extended or adjusted under 35 U.S.C. 154(b) by 45 days.

(21) Appl. No.: 14/101,934

(22) Filed: Dec. 10, 2013

(65) Prior Publication Data

US 2014/0164686 A1    Jun. 12, 2014

(30) Foreign Application Priority Data

Dec. 11, 2012    (KR) .......................... 10-2012-0143722

(51) Int. Cl.
| | |
|---|---|
| *G06F 12/06* | (2006.01) |
| *G06F 3/06* | (2006.01) |
| *G06F 12/08* | (2006.01) |
| *G06F 12/12* | (2006.01) |
| *G06F 13/00* | (2006.01) |

(52) U.S. Cl.
CPC ............ *G06F 3/0647* (2013.01); *G06F 3/0604* (2013.01); *G06F 3/0683* (2013.01); *G06F 12/08* (2013.01); *G06F 12/12* (2013.01); *G06F 2212/171* (2013.01); *G06F 2212/214* (2013.01); *G06F 2212/401* (2013.01)

(58) Field of Classification Search
None
See application file for complete search history.

(56) References Cited

U.S. PATENT DOCUMENTS

| | | | |
|---|---|---|---|
| 5,898,868 A | 4/1999 | Krueger et al. | |
| 6,681,305 B1 | 1/2004 | Franke et al. | |
| 6,877,081 B2 | 4/2005 | Herger et al. | |
| 8,180,981 B2 | 5/2012 | Kapil et al. | |
| 2007/0294496 A1* | 12/2007 | Goss et al. | ..................... 711/163 |
| 2009/0259789 A1 | 10/2009 | Kato et al. | |
| 2011/0145486 A1 | 6/2011 | Owa et al. | |

FOREIGN PATENT DOCUMENTS

| | | |
|---|---|---|
| JP | 2000-276363 | 10/2000 |
| JP | 2008-140236 | 6/2008 |
| JP | 2008-152339 | 7/2008 |
| JP | 2008-226082 | 9/2008 |
| JP | 2011-222051 | 11/2011 |
| KR | 1020070049885 | 5/2007 |

* cited by examiner

*Primary Examiner* — Scott Sun
(74) *Attorney, Agent, or Firm* — F. Chau & Associates, LLC.

(57) ABSTRACT

A mobile device includes a storage configured to store data, a buffer memory configured to include a swap victim buffer area and a normal data area, and an application processor configured to select page data to be swapped from the normal data area and to perform a swapping operation on the selected page data. The swapping operation performs an instant swapping operation or a lazy swapping operation according to a data type of the selected page data.

32 Claims, 17 Drawing Sheets

Fig. 15
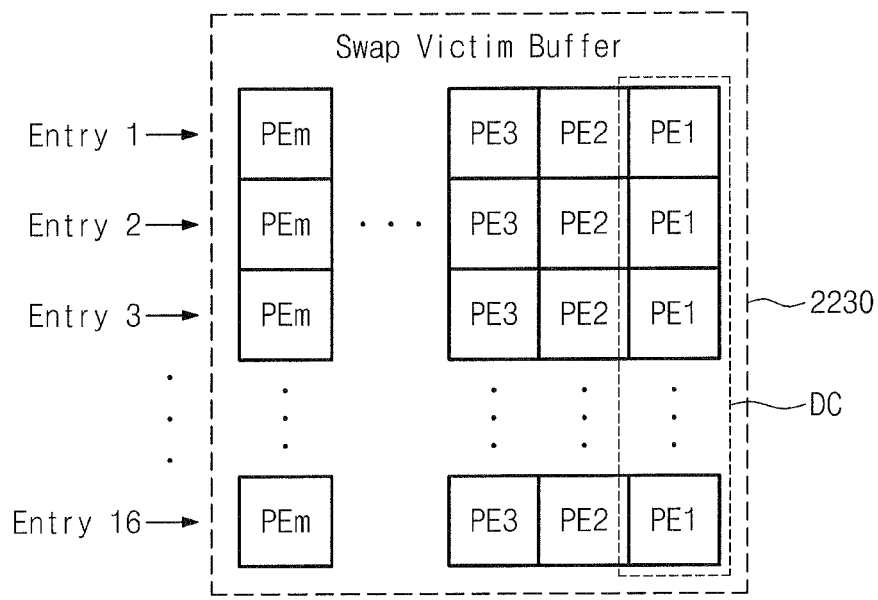
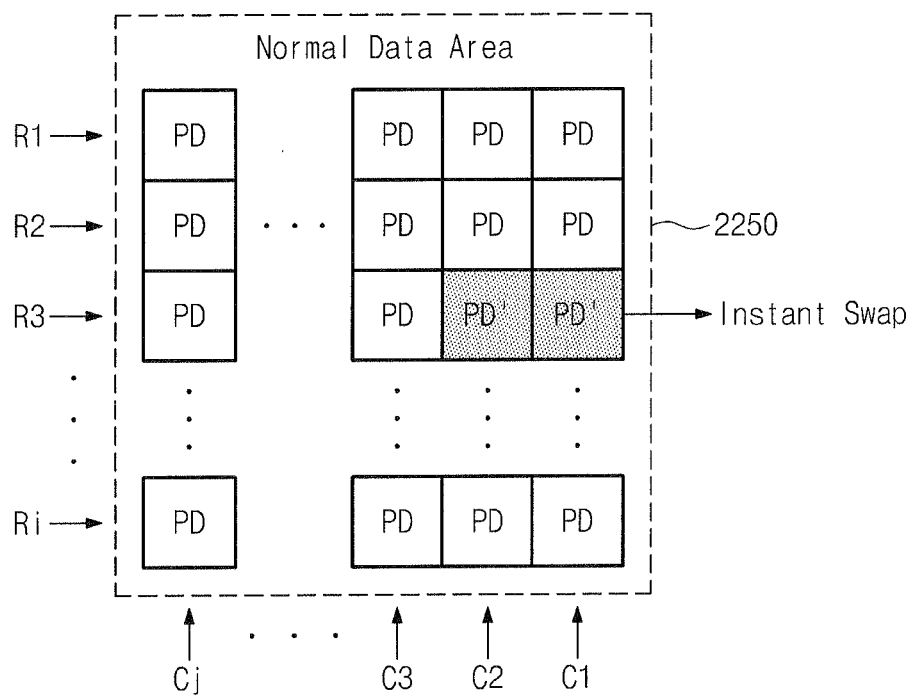

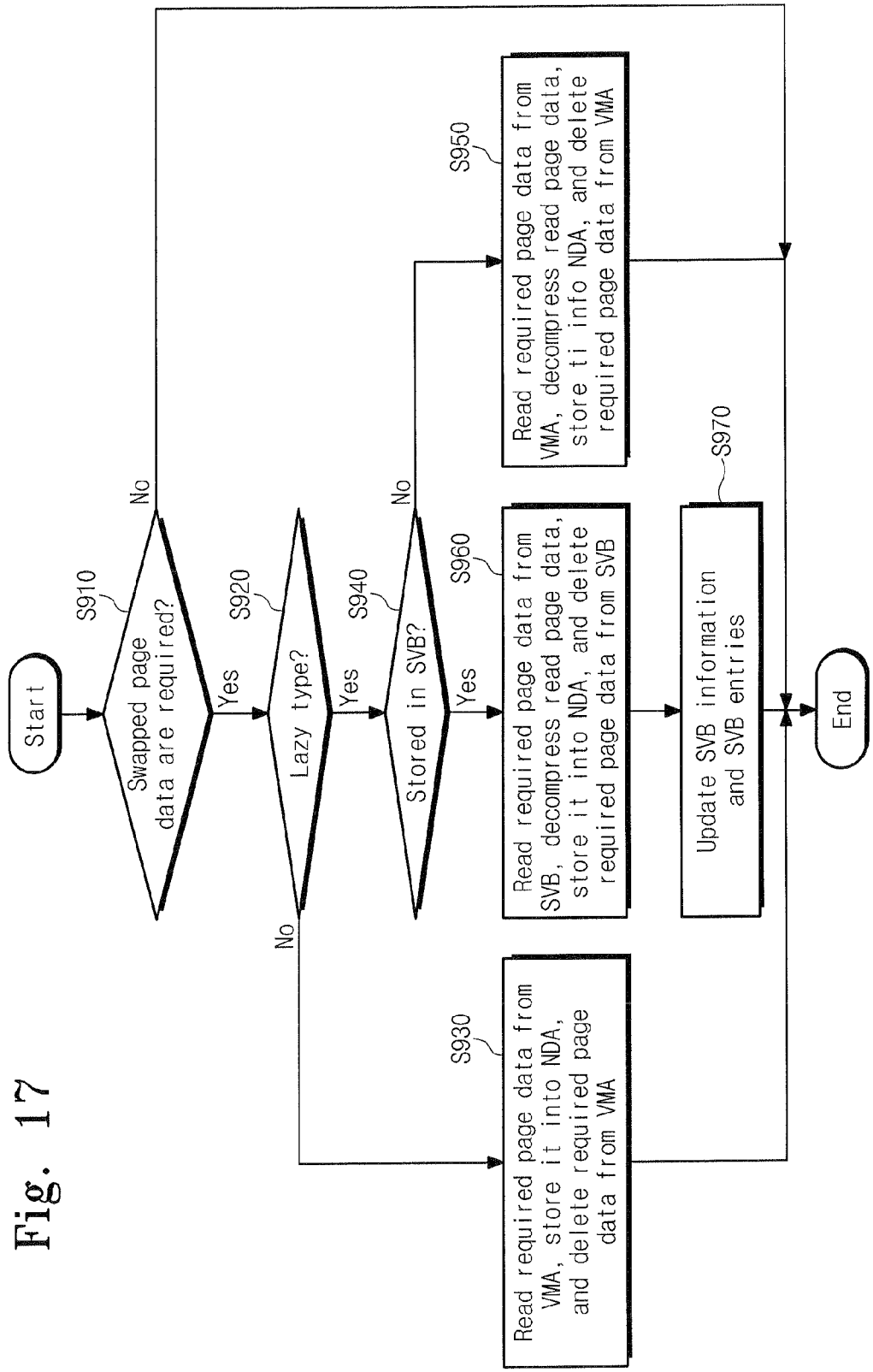

MOBILE DEVICE AND METHOD OF MANAGING DATA USING SWAP THEREOF

CROSS-REFERENCE TO RELATED APPLICATION

This application claims priority under 35 U.S.C. §119 to Korean Patent Application No. 10-2012-0143722, filed Dec. 11, 2012, in the Korean Intellectual Property Office, the disclosure of which is incorporated by reference herein in its entirety.

TECHNICAL FILED

The inventive concept of the present invention relate to a mobile device and a method of managing data using swap.

DISCUSSION OF RELATED ART

Mobile devices such as a smart phone, a tablet device, or a notebook computer operate various application programs. Several application programs are loaded on a volatile memory of the mobile devices. When a new program is loaded on the volatile memory, some of the several application programs may be swapped to a nonvolatile memory.

SUMMARY

According to an exemplary embodiment of the inventive concept, a mobile device includes a storage configured to store data, a buffer memory configured to include a swap victim buffer area and a normal data area, and an application processor configured to select page data to be swapped from the normal data area and to perform a swapping operation on the selected page data. The swapping operation performs an instant swapping operation or a lazy swapping operation according to a data type of the selected page data.

According to an exemplary embodiment of the inventive concept, a mobile device includes a nonvolatile memory, a dynamic random access memory (DRAM) configured to include a swap victim buffer and a normal data area, and an application processor coupled to the nonvolatile memory and the DRAM. When a swap of page data stored in the normal data area is required, the application processor is configured to perform an instant swapping operation or a lazy swapping operation according to a type of the page data. The instant swapping operation instantly shift the page data to the nonvolatile memory, and the lazy swapping operation compresses the page data and shifts the compressed data to the nonvolatile memory through the swap victim buffer area.

According to an exemplary embodiment of the inventive concept, a data managing method of an application processor includes a step of determining a data type of page data stored in a DRAM and a step of performing a lazy swapping operation on the page data when the determined data type is a lazy type and an instant swapping operation on the page data when the determined data type is an instant type.

According to an exemplary embodiment of the inventive concept, an application processor includes a DRAM interface, a flash memory interface, a direct memory access, and a processor. The processor is configured to determine whether a swapping operation is required. The processor is configured to receive page data to be swapped through the DRAM interface. The processor is configured to perform the swapping operation on the page data in an instant swapping operation or a lazy swapping operation according to a data type of the page data. In the lazy swapping operation, the processor is configured to compress the page data and output the compressed page data through the DRAM interface. The direct memory access is configured to control a data path between the DRAM interface and the flash memory interface to shift the outputted compressed page data from the DRAM interface to the flash memory interface.

BRIEF DESCRIPTION OF THE DRAWINGS

These and other features of the inventive concept will become apparent by describing in detail exemplary embodiments thereof with reference to the accompanying drawings of which:

FIGS. 15 and 16 are diagrams illustrating an instant or lazy swapping operation performed in a DRAM according to an exemplary embodiment of the inventive concept; and FIG. 17 is a flow chart illustrating a swapped page data recovering method.

DETAILED DESCRIPTION OF THE EXEMPLARY EMBODIMENTS

Figure 1:
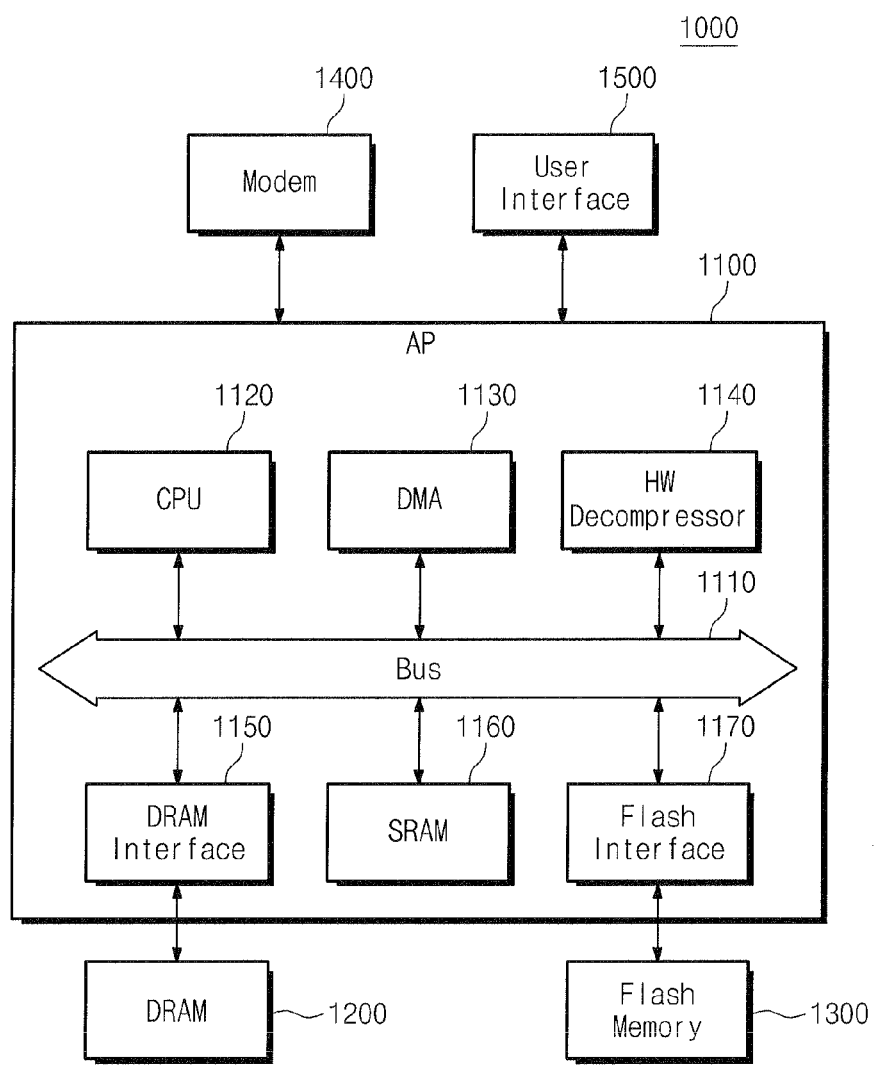
FIG. 1 is a block diagram illustrating a mobile device according to an exemplary embodiment of the inventive concept.

Exemplary embodiments of the inventive concept will be described below in detail with reference to the accompanying drawings. However, the inventive concept may be embodied in different forms and should not be construed as limited to the embodiments set forth herein. Like reference numerals may refer to the like elements throughout the specification and drawings.

It will be understood that when an element is referred to as being "coupled to" another element, it may be directly coupled to the another element, or intervening elements may be present.

FIG. 1 is a block diagram illustrating a mobile device according to an exemplary embodiment of the inventive concept. Referring to FIG. 1, a mobile device 1000 includes an application processor (AP) 1100, a DRAM (Dynamic Random Access Memory) 1200, a flash memory 1300, a modem 1400, and a user interface 1500.

The application processor 1100 controls an overall operation of the mobile device 1000, and performs a logical operation. The application processor 1100 may be formed of a system-on-chip (SoC).

The application processor 1100 includes a bus 1110, a CPU (Central Processing Unit) 1120, a direct memory access (DMA) 1130, a derompressor 1140, a DRAM interface 1150, an SRAM (Static Random Access Memory) 1160, and a flash interface 1170. In FIG. 1, there are not illustrated interfaces which enable the application processor 1100 to communicate with the modem 1400 and the user interface 1500.

The bus 1110 provides a channel among components of the application processor 1100. The CPU 1120 performs a main calculation operation, performs a data processing operation and performs overall control of the application processor 1100. The direct memory access 1130 controls data exchange between memories including the DRAM 1200 and the flash memory 1300.

The DMA 1130 operates according to control of the CPU 1120. For example, the DMA 1130 is programmed by the CPU 1120 and operate according to the programmed condition. The programmed DMA 1130 controls a data flow among storage elements of the mobile device 1000 without control of the CPU 1120. For example, the DMA 1130 controls a data flow between at least two of the DRAM 1200, the SRAM 1160, and the flash memory 1300.

The decompressor 1140 decompresses compressed page data. The decompressor 1140 may be implemented in a hardware unit. The DRAM interface 1150 supports communication with the DRAM 1200. The SRAM 1160 serves as a cache memory, a buffer memory, or a temporary memory of the application processor 1100. The flash interface 1170 supports communication with the flash memory 1300.

The DRAM 1200 serves as a buffer memory or a working memory of the mobile device 1000. For example, there is illustrated an example where a working memory of the mobile device 1000 is formed of the DRAM 1200. However, the working memory of the mobile device 1000 may include various memories such as an SRAM, a NOR flash memory, a phase-change RAM (PRAM), a magnetic RAM (MRAM), a resistive RAM (RRAM), a ferroelectric RAM (FRAM), etc. The working memory may be nonvolatile or volatile.

The flash memory 1300 serves as a storage device for storing data. In an exemplary embodiment, the storage device may include, but is not limited to, a hard disk drive or a nonvolatile memory such as a phase-change RAM (PRAM), a magnetic RAM (MRAM), a resistive RAM (RRAM), or a ferroelectric RAM (FRAM).

The modem 1400 performs wireless or wire communication according to control of the application processor 1100. The modem 1400 communicates using a communication protocol including WiFi, CDMA (Code Division Multiple Access), GSM (Global System for Mobile communication), LTE (Long Term Evolution), Bluetooth, NFC (Near Field Communication), and so on. For example, the modem 1400 may be integrated with the application processor 1100 in a system-on-chip device.

The user interface 1500 exchanges signals with an external device. For example, the user interface 1500 may include user input interfaces including a keyboard, a keypad, a button, a touch panel, a touch screen, a touch pad, a touch ball, a camera, a microphone, a gyroscope sensor, or a vibration sensor. The user interface 1500 may further include user output interfaces including an LCD (Liquid Crystal Display), an OLED (Organic Light Emitting Diode) display device, an AMOLED (Active Matrix OLED) display device, an LED, a speaker, or a motor.

Figure 2:
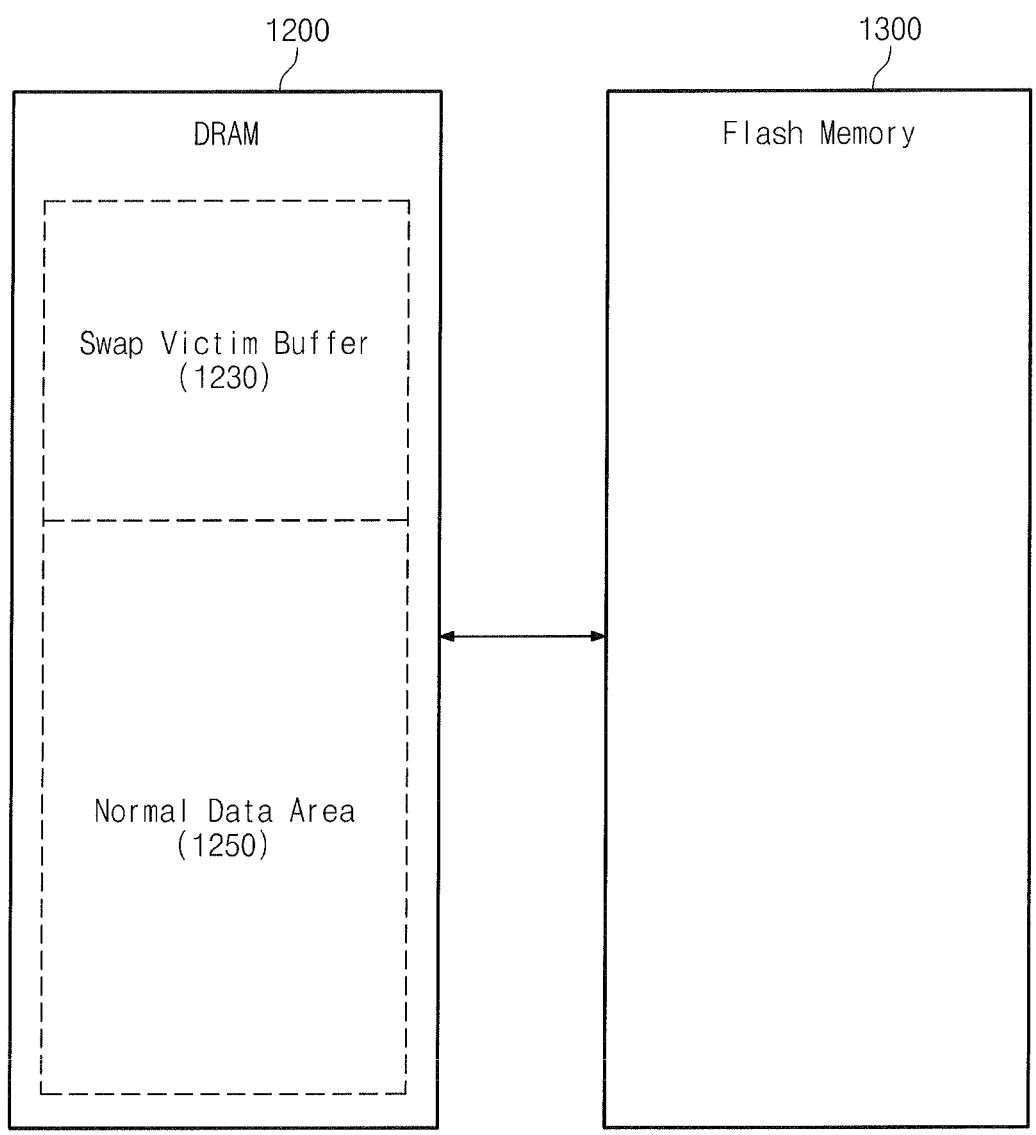
FIG. 2 is a block diagram illustrating an memory hierarchy according to an exemplary embodiment of the inventive concept.

FIG. 2 is a block diagram illustrating architecture for data areas of the DRAM and the flash memory of FIG. 1. Referring to FIG. 2, the DRAM 1200 includes a swap victim buffer area (SVB) 1230 and a normal data area (NDA) 1250.

When data of the normal data area 1250 is swapped into the flash memory 1300, the swapped data is temporarily stored in the swap victim buffer area 1230. For example, at least a portion of data stored at the normal data area 1250 is moved to the swap victim buffer area 1230 and then to the flash memory 1300.

The normal data area 1250 is accessed by processes driven by the application processor 1100. For example, codes of the processes or data managed by the processes are stored in the normal data area 1250.

For example, in the DRAM 1200, data is managed by a page unit. A page has a size defined by an operating system (OS) of the mobile device 1000. Codes or data of the processes is stored in the DRAM 1200 by the page unit, and is read from the DRAM 1200 by the page unit. Hereinafter, data accessed by the page unit may be called page data.

The flash memory 1300 serves as a storage device of the mobile device 1000. The flash memory 1300 stores user data and swap data. For example, the application processor 1100 stores processed data (e.g., data including process data or data managed by a process) in the DRAM 1200, and swaps part of the processed data into the flash memory 1300. Swap data may be data swapped by the application processor 1100.

Figure 3:
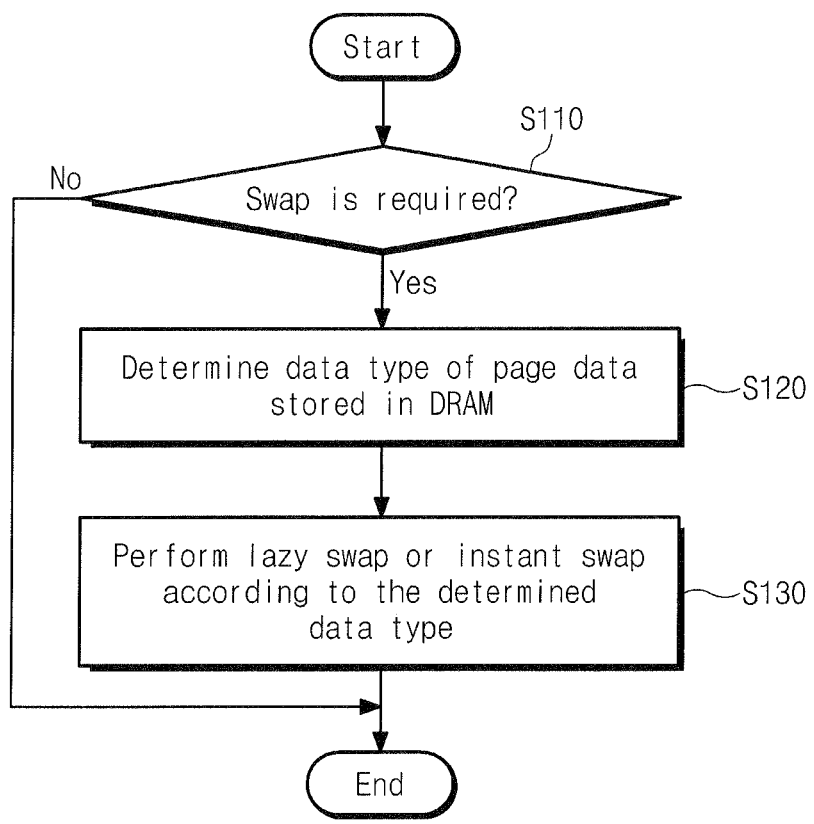
FIG. 3 is a flow chart illustrating a data managing method according to an exemplary embodiment of the inventive concept.

FIG. 3 is a flow chart illustrating a data managing method of the mobile device of FIG. 1 according to an exemplary embodiment of the inventive concept. For example, a data managing method of an application processor 1100 is illustrated in FIG. 3.

In operation S110, whether a swapping operation is required is determined. The application processor 1100 determines whether page data stored in the normal data area 1250 is required to be shifted to the flash memory 1300. If a swapping operation is not required, the method is ended. If the swapping operation is required, the method proceeds to operation S120. The operation S110 will be more fully described with reference to FIG. 4.

In operation S120, a type of page data stored in the DRAM 1200 is determined. For example, the application processor 1100 determines a type of page data, selected as a swap target, from among page data stored in the normal data area 1250. The operation S120 will be more fully described with reference to FIGS. 5 to 8 and 12.

In operation S130, the swapping operation is performed in a lazy swap or an instant swap according the data type determined in operation S120. The operation S130 will be more fully described with reference to FIGS. 13 to 16.

Figure 4:
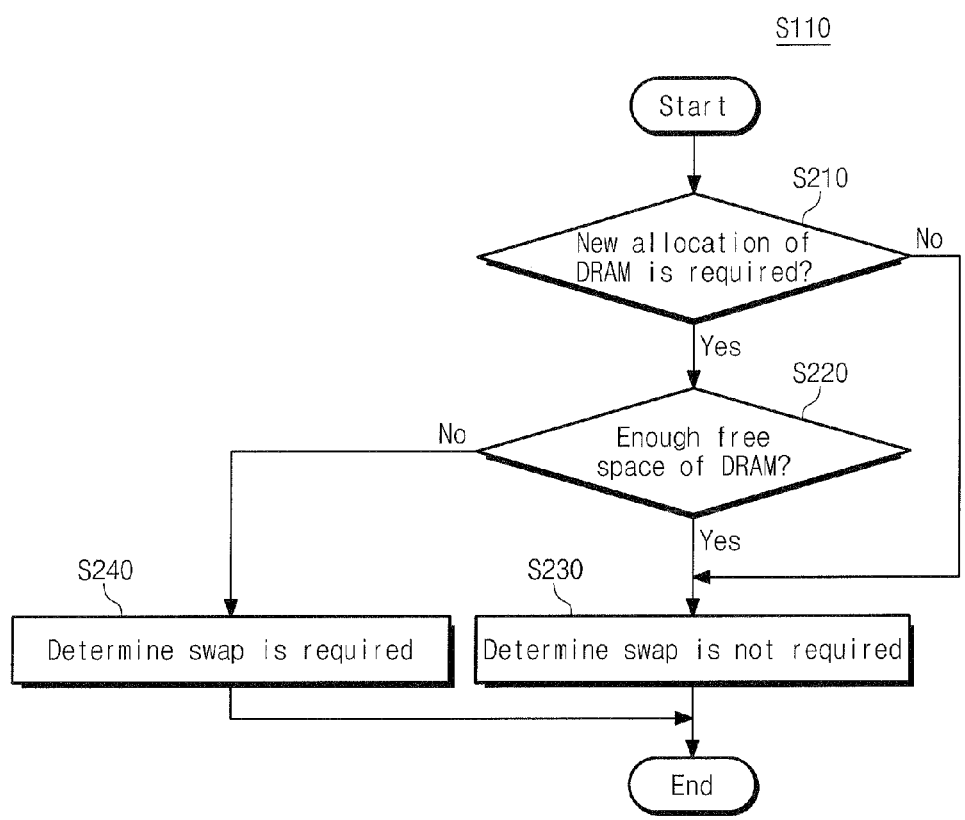
FIG. 4 is a flaw chart illustrating a swap determining method according to an exemplary embodiment of the inventive concept.

FIG. 4 is a flow chart illustrating the operation S110 of FIG. 3 in detail according to an exemplary embodiment of the inventive concept. Referring to FIGS. 1 and 4, in operation S210, it is determined whether the application processor 1100 executes a process other than the processes such as the application processor 100 stored in the DRAM 1200. In that case, the application processor 1100 allocates a memory space of the DRAM 1200 for the new process. For example, one or more pages of the normal data area 1250 may be allocated to the new process of the application processor 1100.

In operation S220, it is determined whether the DRAM 1200 has a free memory space to accommodate the process of the application processor 1100. The application processor 1100 allocates a predetermined number of pages of the normal data area 1250 to the process. For example, the application processor 1100 determines the number of pages required for the process, based on a run history of the process.

When the number of pages required by the process is less than the free memory space of the normal data area 1250, it is determined that the normal data area 1250 has enough free memory space for the process and thus, a swapping operation is not required (S230).

When the number of pages required by the process is more than the free memory space of the normal data area 1250, it is determined that the normal data area 1250 is insufficient for the process and thus, a swapping operation is required (S240). For example, some processes stored in the DRAM 1200 are shifted to the flash memory 1300 to make memory space for the new process.

Figure 5:
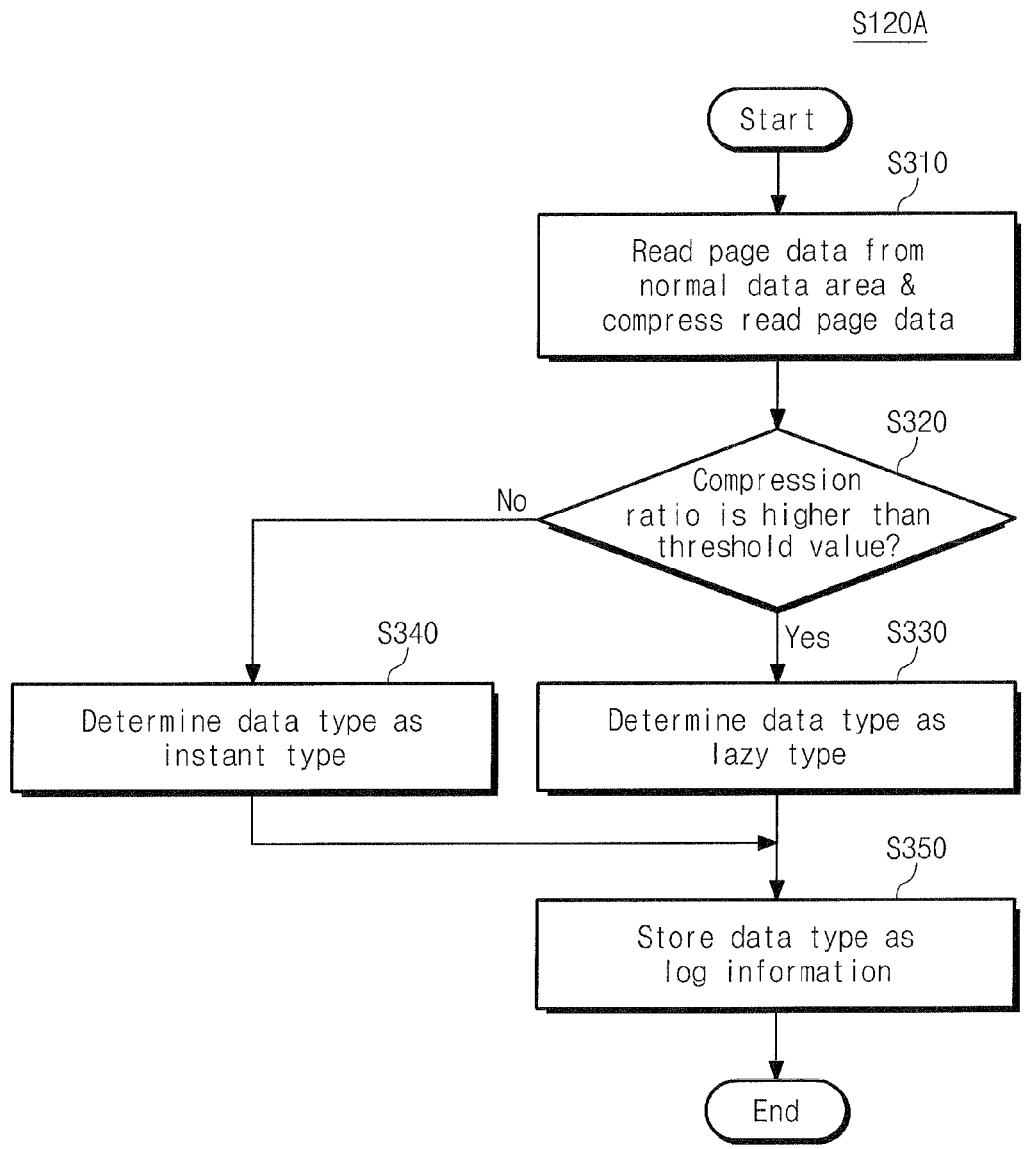
FIG. 5 is a flow chart illustrating a page data type determining method according to an embodiment of the inventive concept.

FIG. 5 is a flow chart illustrating the operation S120 of FIG. 3 according to an exemplary embodiment of the inventive concept.

In operation S310, page data is read from a normal data area 1250, and the read page data is compressed. For example, a CPU 1120 reads page data selected as a swap target from a normal data area 1250 of a DRAM 1200 through a DRAM interface 1150. The CPU 1120 may compress the read page data.

In operation S320, whether a compression ratio of the compressed page data is higher than a threshold value is determined. For example, the CPU 1120 compresses the read page data and then compares the compression ratio of the compressed page data with the threshold value.

If the compression ratio is not higher than a threshold value, in operation S340, a data type of the read page data is determined to be an instant type. For example, page data having the instant type has a compression ratio lower than the threshold value. When a data type of the read page data is determined to be an instant type, the compressed page data may be discarded.

If the compression ratio is higher than the threshold value, in operation S330, a data type of the read page data is determined to be a lazy type. For example, page data having the lazy type has a compression ratio higher than the threshold value. When a data type of the read page data is determined to be a lazy type, the compressed page data is shifted to the swap victim buffer area 1230. In this case, the application processor 1100 may reduce the number of a swapping operation and thus may improve system performance.

In operation S350, the data type is stored as log information. For example, the CPU 1120 stores the data type of the page data in the SRAM 1160 as the log information. The CPU 1120 stores an identifier of a process using the page data, information indicating whether the page data is a code or data, and the data type of the page data, as the log information. The log information stored in the SRAM 1160 is backed up in a flash memory 1300 periodically, according to a predetermined schedule, or in response to generation of a particular event (e.g., power-off). When a power of a mobile device 1000 is turned on, the log information backed up in the flash memory 1300 is copied to the SRAM 1160.

Figure 6:
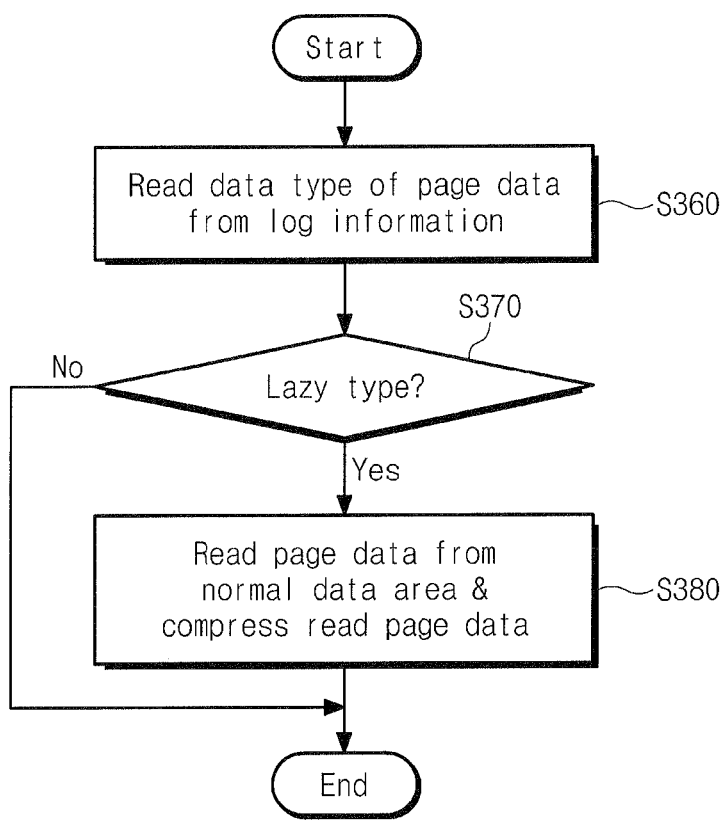
FIG. 6 is a flow chart illustrating a data type determining method according to an exemplary embodiment.

FIG. 6 is a flow chart illustrating a data type determining method of a CPU when a data type is predicted according to an exemplary embodiment.

In operation S360, a data type of page data is read from log information. The data type of page data is predicted based header information of the page data. The CPU 1120 reads log information stored in the SRAM 1160 and determines a data type of page data included in the log information.

In operation S370, whether the read data type is a lazy type is determined. If the read data type is not a lazy type, compression on page data stored in the normal data area 1250 is skipped, and the method is ended. If the read data type is a lazy type, in operation S380, page data is read from the normal data area 1250, and the read page data is compressed. The compressed page data is swapped by a lazy swapping operation.

Figure 7:
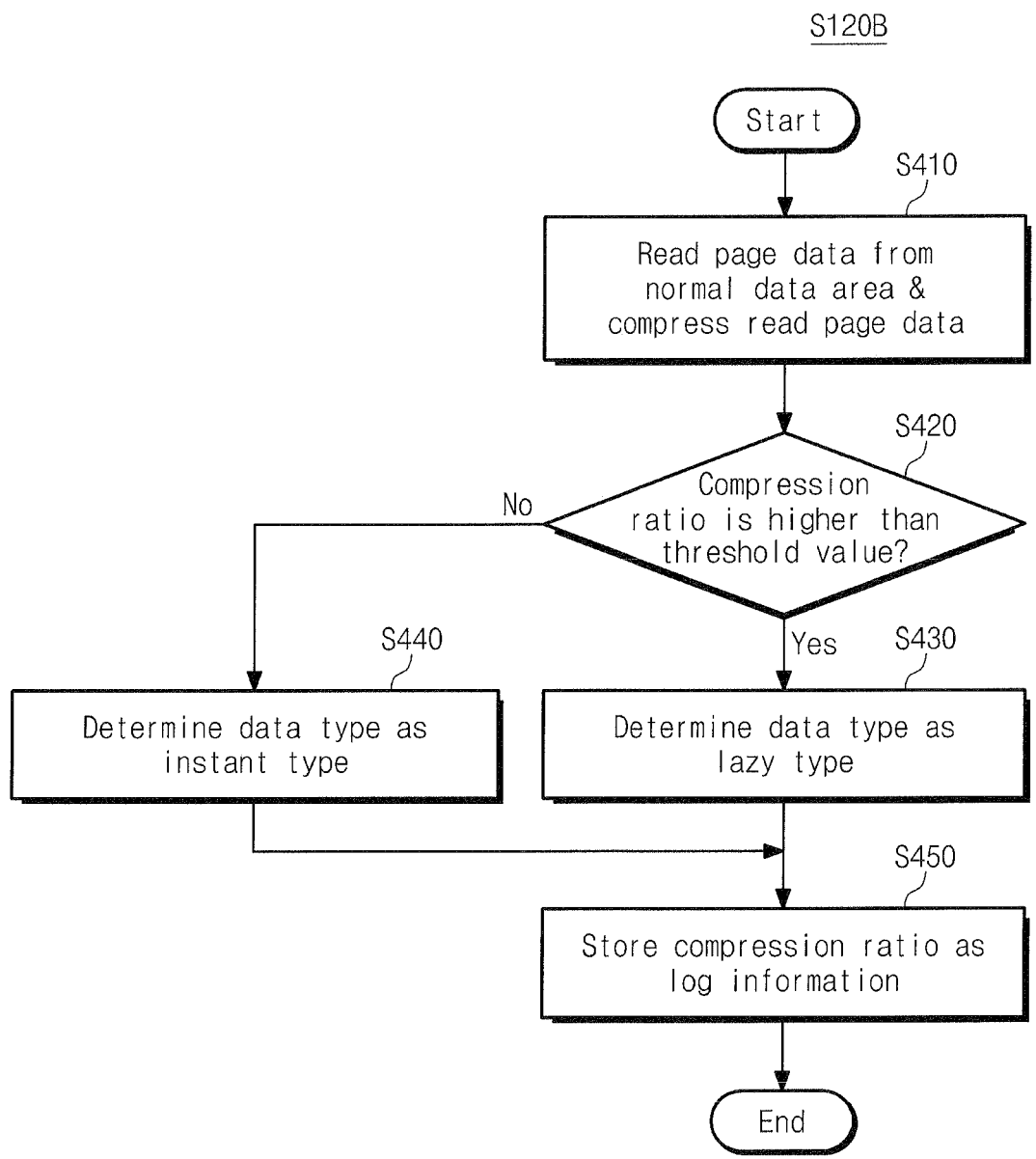
FIG. 7 is a flow chart illustrating a page data type determining method according to an exemplary embodiment of the inventive concept.

FIG. 7 is a flow chart illustrating the step S120 of FIG. 3 according to an exemplary embodiment of the inventive concept. Operations S410 to S440 in FIG. 7 are performed in a substantially same manner as described with reference to operations S310 to S340 in FIG. 5, and a description thereof may be omitted.

In operation S450, a compression ratio of page data selected as a swap target is stored as log information. For example, the CPU 1120 stores a compression ratio of page data in the SRAM 1160 as log information. The CPU 1120 stores an identifier of a process using the page data, information indicating whether the page data is a code or data, and the compression ratio of page data, as the log information.

Figure 8:
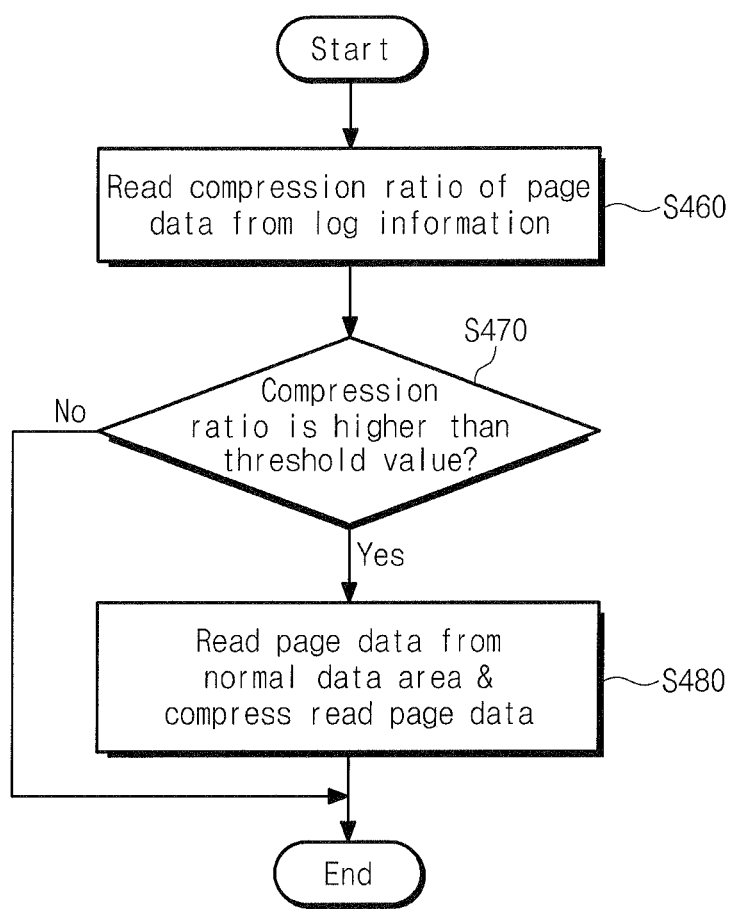
FIG. 8 is a flow chart illustrating a data type determining method according to an exemplary embodiment.

FIG. 8 is a flow chart schematically illustrating a data type determining method of a CPU when a compression ratio (or data type) determined in FIG. 7 is stored as log information and then data type determining is again required.

In operation S460, a compression ratio of page data is read from log information. The CPU 1120 reads log information stored in the SRAM 1160 and determines a compression ratio of page data included in the log information.

In operation S470, whether the read compression ratio is higher than a threshold value is determined. If the read compression ratio is not higher than the threshold value, compression on page data stored in the normal data area 1250 is skipped, and the method is ended. If the read compression ratio is higher than a threshold value, in operation S480, page data is read from the normal data area 1250, and the read page data is compressed. The compressed page data may be used for a swap.

In an exemplary embodiment, a data type is decided according to a compression ratio of page data. Compressed page data is used for a swap or discarded according to a data type.

In an exemplary embodiment, a data type of page data is predicted and the predicted data type is stored as log information. In this case, a data type is determined by reading log information without compression of the page data. Since a data type is checked and then compression is performed, unnecessary compression (e.g., compression of page data not necessitating compression) is prevented, and the performance of a mobile device 1000 is increased.

Figure 9:
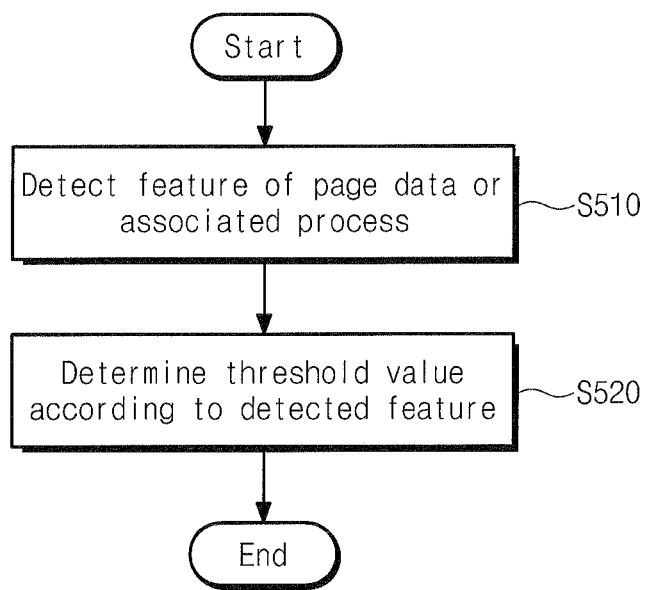
FIG. 9 is a flow chart illustrating a threshold value control method according to an exemplary embodiment of the inventive concept.

FIG. 9 is a flow chart illustrating a threshold value control method of a CPU according to an exemplary embodiment of the inventive concept.

In operation S510, a feature of page data or a process associated with the page data is detected. In operation S520, a threshold value is decided according to the detected feature. For example, a threshold value for determining whether page data is swapped by an instant or lazy swapping operation is varied according to a feature of page data selected as a swap target or a process associated with the page data.

When the mobile device 100 performs various processes, a fixed threshold value is varied to balance the number of a lazy swapping operation and the number of an instant swapping operation. For example, a process and its data for editing documents may have a high compression ratio. If the mobile device 100 performs processes and data having a high compression ratio and a threshold value is fixed, the application processor 1100 may mostly performs a lazy swapping operation. On the other hand, a process and its data for manipulating moving pictures may have a low compression ratio. If the application processor 1100 performs processes and data having a low compression ratio and a threshold value is fixed, the application processor 1100 may mostly performs an instant swapping operation.

The threshold value is varied based on a feature of a process and a compression ratio of data, and thus a ratio of an instant swapping operation and a lazy swapping operation is controlled.

Figure 10:
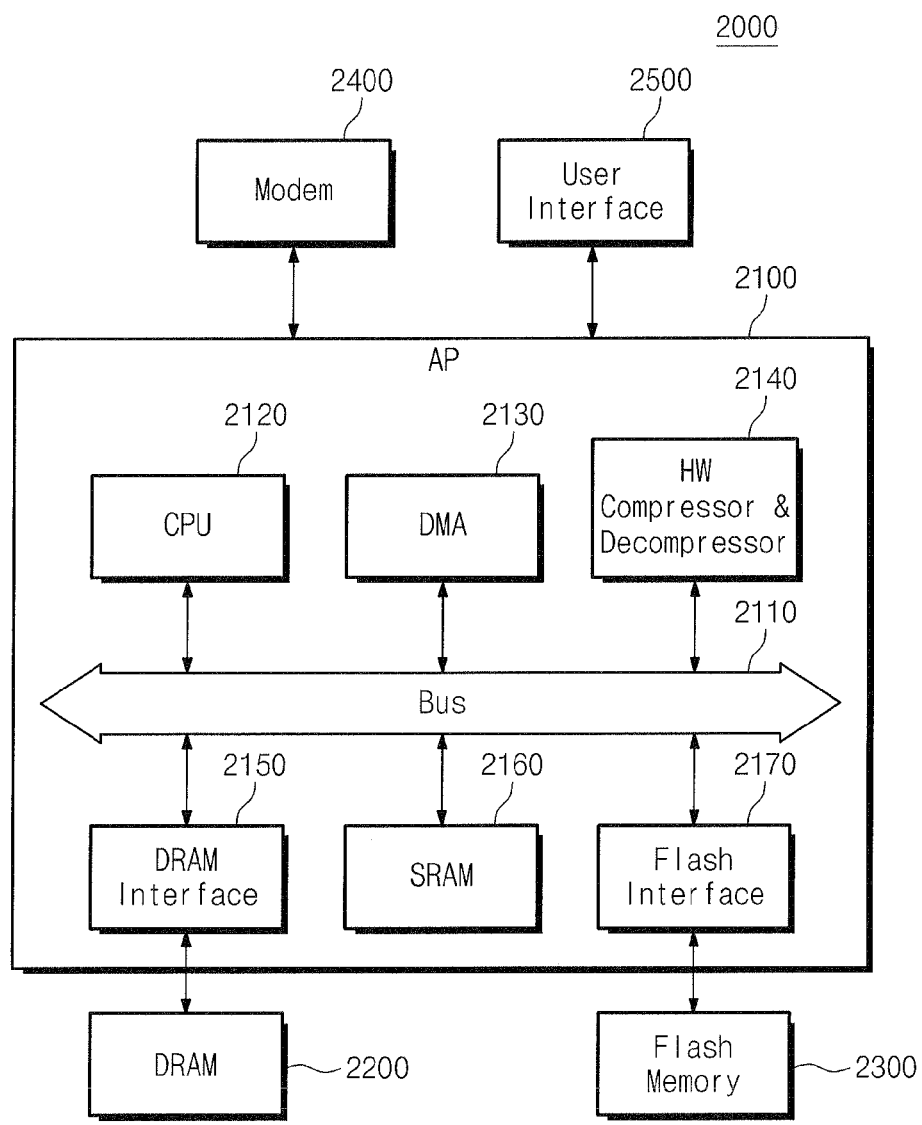
FIG. 10 is a block diagram illustrating a mobile device according to an exemplary embodiment of the inventive concept.

FIG. 10 is a block diagram illustrating a mobile device according to an exemplary embodiment of the inventive concept. Referring to FIG. 10, a mobile device 2000 includes an application processor 2100, a DRAM 2200, a flash memory 2300, a modem 2400, and a user interface 2500. The application processor 2100 includes a bus 2110, a CPU 2120, a DMA 2130, a compressor and decompressor block 2140, a DRAM interface 2150, an SRAM 2160, and a flash interface 2170.

The mobile device 2000 compresses page data and decompresses compressed page data using the compressor and decompressor block 2140. Compared with an application processor 1100 in FIG. 1, the application processor 2100 is configured such that compression on page data is performed by the compressor and decompressor block 2140, not the CPU 2120. In FIG. 10, compression or decompression is performed by a dedicated hardware of the compressor and decompressor block 2140.

Figure 11:
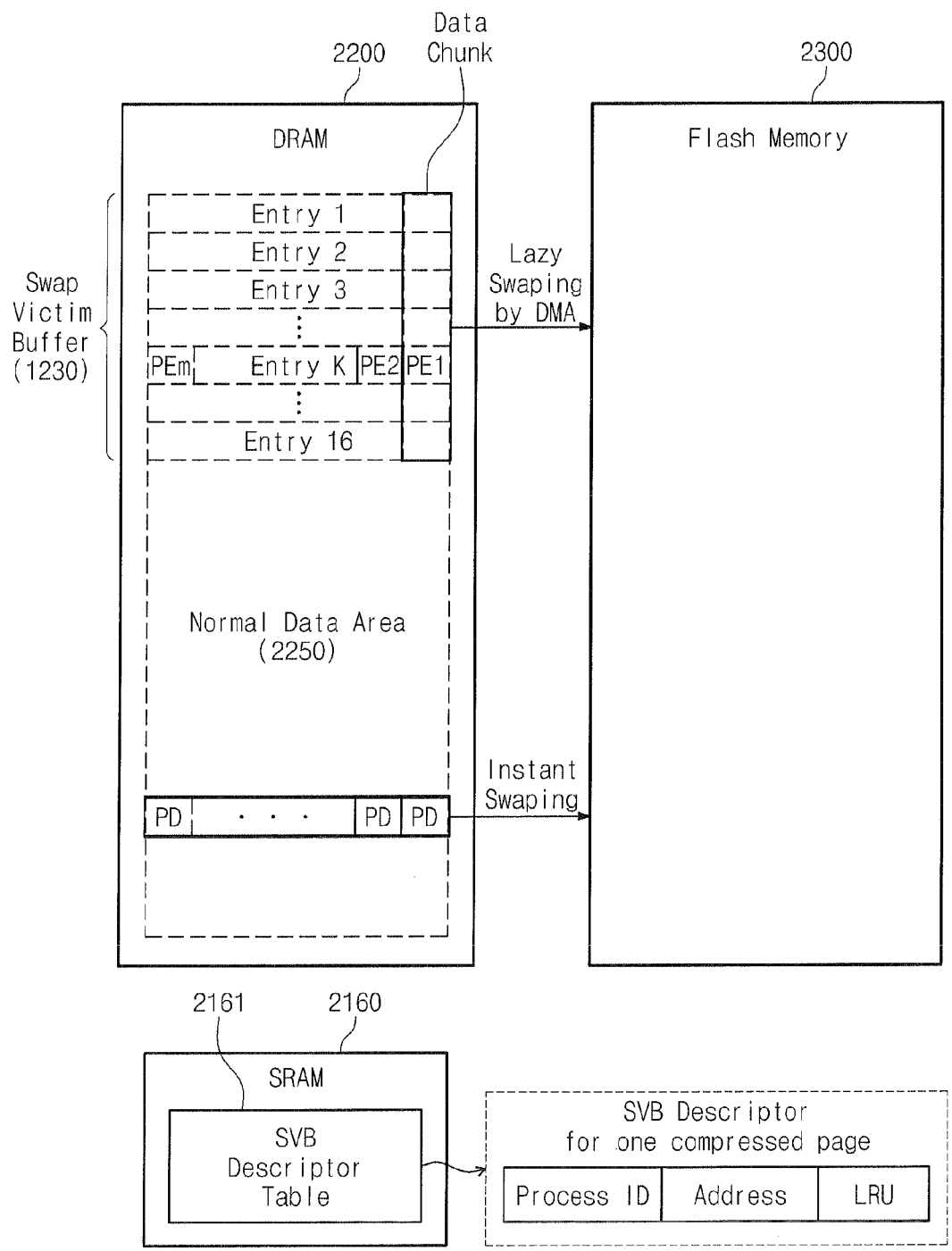
FIG. 11 is a block diagram illustrating a memory hierarchy according to an exemplary embodiment of the inventive concept.

FIG. 11 is a block diagram illustrating the architecture of data areas of a DRAM, an SRAM, and a flash memory of FIG. 10. Referring to FIG. 11, a DRAM 2200 is divided into a swap victim buffer area 2230 and a normal data area 2250.

When data stored at the normal data area 2250 is swapped into a flash memory 2300, the swap victim buffer area 2230 stores the swapped data by a lazy swapping operation. Referring to FIG. 11, the swap victim buffer area 2230 includes a plurality of entries (e.g., Entry1 to Entry16), each of which includes a plurality of page entries PE1 to PEm. A page entry corresponds to a page of compressed data. For example, a page of compressed data is stored at the swap victim buffer area 2230 as a page entry.

A page entry (or, compressed page data) in each of the plurality of entries Entry1 to Entry16 collectively forms a data chunk DC. For example, the page entries PE1 to PEm is arranged in a matrix form having a plurality of row page entries and a plurality of column entries. A row of page entries PE1 to PEm constitutes a page. A column of page entries stored in different pages PE1 to PEm constitutes a data chunk DC.

For example, the page entries PE1 to PEm of each of the plurality of entries Entry1 to Entry16 is managed according to a linked list. For example, first compressed page data stored at an entry (e.g., Entry_K) is stored as a first page entry PE1. Second compressed page data stored at the entry (e.g., Entry_K) is stored as a second page entry PE2. The first page entry PE1 is linked with the second page entry PE2. Likewise, the page entries PE1 to PEm are linked with one another.

When one page entry of linked page entries PE1 to PEm is removed, a link relationship among the linked page entries PE1 to PEm is updated. For example, if a second page entry PE2 is removed, first and third page entries PE1 and PE3 is linked to each other. The page entries PE3 to PEm is updated to be managed as page entries PE2 to PEm-1. Afterwards, newly stored compressed page data is stored at a page entry PEm. For example, the earliest stored page entries PE1 is located at one side of each of the plurality of entries Entry1 to Entry16. The page entries PE1 of the plurality of entries Entry 1 to Entry 16 forms a data chunk DC.

The normal data area 2250 is accessed by processes (or, applications) driven on an application processor 2100. For example, codes of processes and data handled by the processes are stored in the normal data area 2250.

For example, data in the DRAM 2200 is managed by a page unit. A page has a size defined by an operating system OS of the mobile device 2000.

Codes of processes or data are stored in the DRAM 2200 by the page unit or read from the DRAM 2200 by the page unit.

The flash memory 2300 serves as storage of the mobile device 2000. The application processor 2100 stores processed data (e.g., data including process data or data handled by the process) at the DRAM 2200, and swaps part of the processed data into the flash memory 2300.

Figure 12:
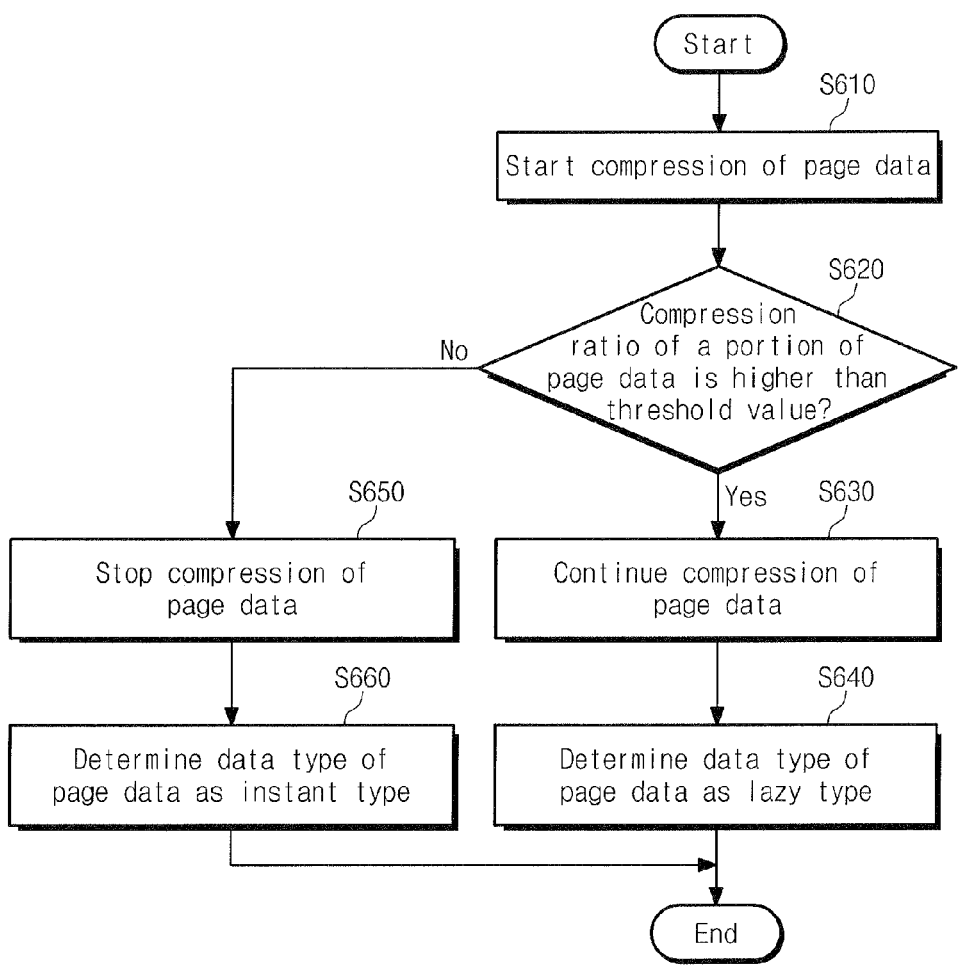
FIG. 12 is a flow chart illustrating a page data type determining method according to an exemplary embodiment of the inventive concept.

FIG. 12 is a flow chart illustrating a page data type determining method of an application processor of FIG. 10.

In operation S610, compression of page data is commenced. For example, page data selected as a swap target is read from the normal data area 2250, and the read page data is sent to the compressor and decompressor block 2140. The compressor and decompressor block 2140 may start to compress the input page data.

In operation S620, whether a compression ratio of part of the page data is higher than a threshold value is determined. For example, the compressor and decompressor block 2140 compares the compression ratio and the threshold value before compression is completed.

If the compression ratio is higher than the threshold value, in operation S630, the page data is continuously compressed. In operation S640, a data type of the page data is determined to be a lazy type. The compressed page data is shifted to the swap victim buffer area 2230

If the compression ratio is lower than the threshold value, in operation S650, compression on the page data is stopped. In operation S660, a data type of the page data is determined to be an instant type.

In an exemplary embodiment, compression and decompression on page data are performed by the compressor and decompressor block 2140 which is separated from the CPU 2120. Thus, compression and decompression on page data are performed without consumption of a resource of the CPU 2120, and a compression ratio is determined before compression is ended. It is possible to prevent unnecessary compression from being performed by comparing the compression ratio and the threshold value before compression is ended.

In an exemplary embodiment described above, a page data type is determined using a compression ratio of page data compressed. The page data type determining method is not limited thereto. For example, a page data type is predicted without compression. For example, multimedia data may have a low compression ratio, and a text or code may have a high compression ratio. The application processor 2100 may determine whether page data is multimedia data, text data or code data, using header information read from the page data. Based on the determination result, the application processor

2100 decides the multimedia data as data having an instant type and decides the text or code as data having a lazy type.

Figure 13:
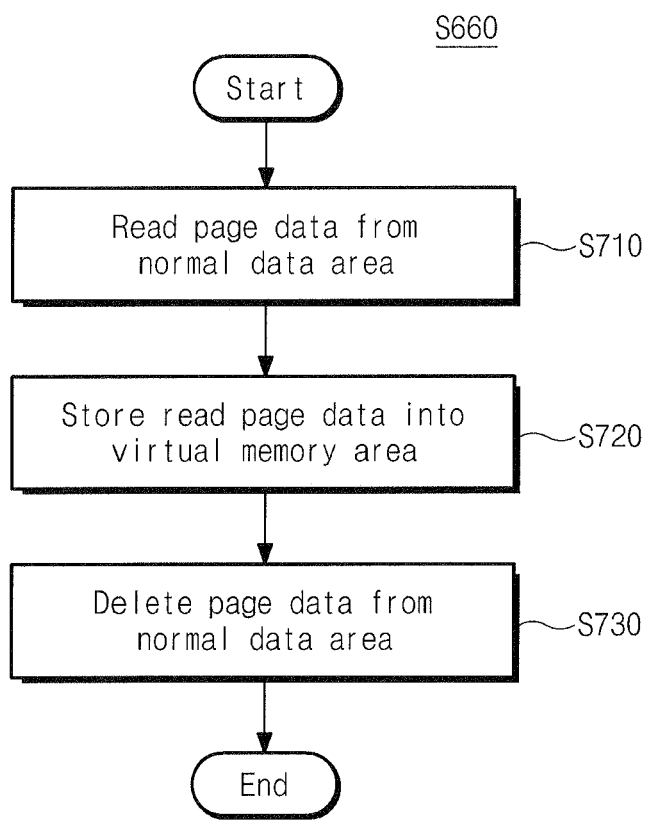
FIG. 13 is a flow chart illustrating an instant swap method according to an exemplary embodiment of the inventive concept.

FIG. 13 is a flow chart illustrating an instant swap method of FIG. 12. An instant swapping operation is performed when page data is determined to be data having an instant type. For example, when a compression ratio of the page data is not higher than a threshold value, the instant swapping operation is performed.

Referring to FIGS. 11 and 13, in operation S710, page data is read from a normal data area 2250. For example, an application processor 2100 reads page data selected as a swap target at an upper level (e.g., an operating system) from the normal data area 2250.

In operation S720, the read page data is shifted to the flash memory 2300. The application processor 2100 stores the read page data in the flash memory 2300.

In operation S730, the page data is deleted from the normal data area 2250. In an exemplary embodiment, the application processor 2100 overwrites a new process or its data on page data.

For example, an instant type of page data that has a compression ratio lower than a threshold value is swapped into the flash memory 2300 without using the swap victim buffer area 2230. For example, when a swapping operation is required to perform a new process and a swap target page is determined to be an instant type, the application processor 2100 instantly swap of the swap target page into the flash memory 2300.

Figure 14:
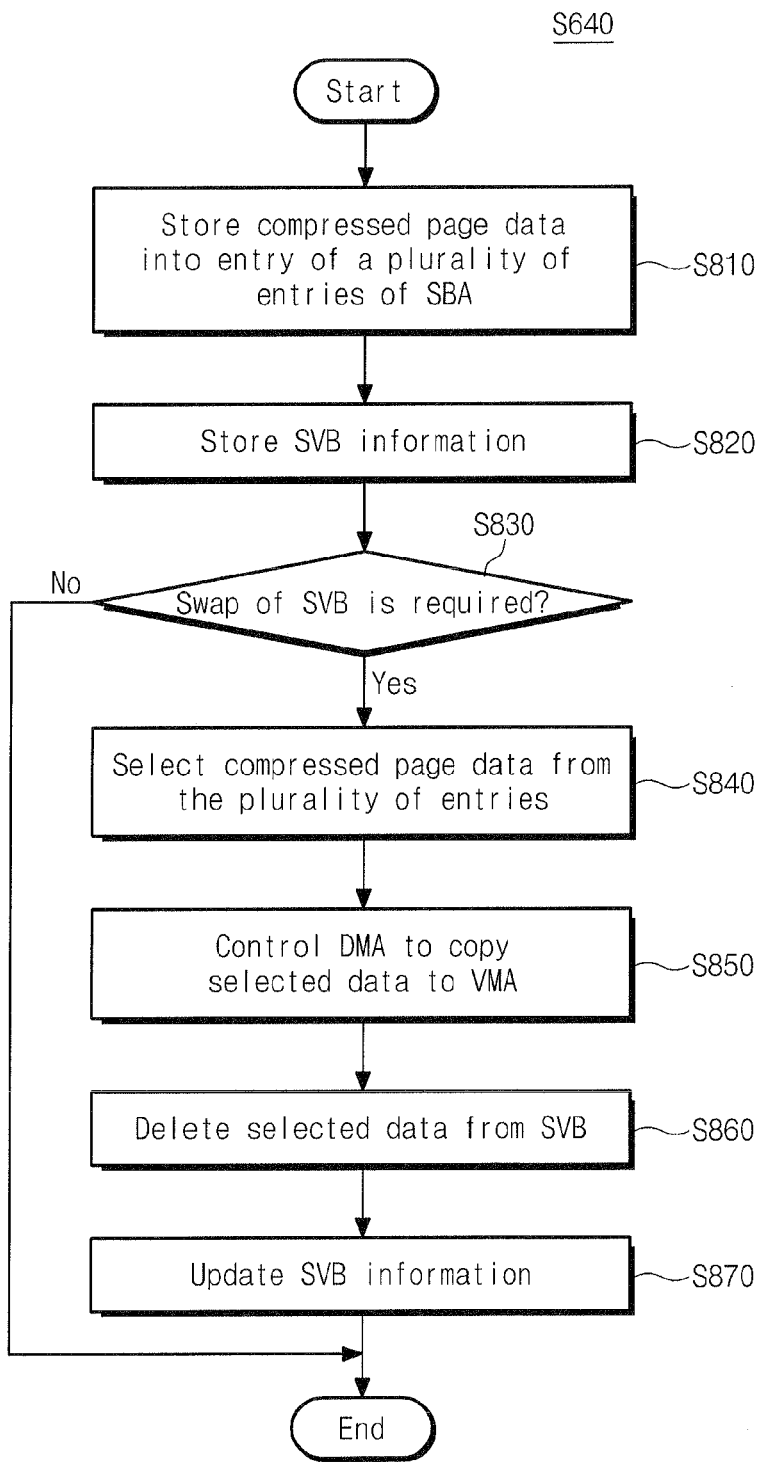
FIG. 14 is a flow chart illustrating a lazy swap method according to an exemplary embodiment of the inventive concept.

FIG. 14 is a flow chart illustrating a lazy swap method of FIG. 12. A lazy swapping operation is performed when a type of page data is determined to be a lazy type. For example, a lazy swapping operation is performed when a compression ratio of page data is higher than a threshold value. (comment: Fix Error)

Referring to FIGS. 11 and 14, in operation S810, compressed page data is stored at one of the plurality of entries of the swap victim buffer area 2230. The swap victim buffer area 2230 includes the plurality of entries Entry 1 to Entry 16, each of which has the plurality of page entries PE1 to PEm. A page of compressed data is shifted to selected page entry in a selected entry.

In operation S820, swap victim buffer (SVB) information is stored in the SRAM 2160. The SVB information includes information on compressed page data stored in the swap victim buffer area 2230. For example, the SVB information includes a process identifier, an address, and LRU (Least Recently Used) information associated with compressed page data stored at the swap victim buffer area 2230 of FIG. 11. The address includes a mapping relationship between an address of the normal data area 2250 at which the compressed page data is stored or an address of the flash memory 2300 corresponding to the compressed page data selected as a swap target page. The LRU information includes information on a time when the compressed page data is most recently accessed.

In operation S830, whether a swap of the swap victim buffer area 2230 is required is determined. The application processor 2100 determines whether a swap of the swap victim buffer area 2230 is required. For example, when the application processor performs a lazy swapping operation, a swap target page is shifted to the swap victim buffer area 2230. In that case, the application processor 2100 determines whether the swap victim buffer area 2230 has some entries to accommodate the swap target page. The application processor 2100 determines whether a swap is required based on the determination result. Whether a swap is required is determined according to a free space size of the swap victim buffer area 2230.

If a swap of the swap victim buffer area 2230 is not required, the method is ended. A lazy swapping operation is performed without shifting some of page entries of the swap victim buffer area 2230 to the flash memory 2300. If a swap of the swap victim buffer area 2230 is required, the method proceeds to operation S840.

In operation S840, compressed page data stored in the swap victim buffer area 2230 is selected from the plurality of entries of the swap victim buffer area 2230. For example, the application processor 2100 selects a page of compressed data from each of the plurality of entries. For example, the application processor 2100 selects compressed page data in a unit of a data chunk DC, which is earliest stored among the plurality of entries.

In an exemplary embodiment, the unit of the data chunk is set such that a data transfer time of the data chunk by the direct memory access is equal to or shorter than a data transfer time of the data chunk by the application processor. The data transfer time of the data chunk by the direct memory access includes a programming time of the DMA. For example, the unit of the data chunk has a size of 32 KB or more.

In operation S850, the direct memory access 2130 of FIG. 10 shifts the selected compressed page data to the flash memory 2300. The application processor 2100 programs the direct memory access 2130 such that the selected compressed page data is shifted, in a unit of the data chunk DC, to the flash memory 2300.

In operation S860, the selected compressed page data is deleted from the swap victim buffer area 2230. The application processor 2100 deletes the selected compressed page data from the swap victim buffer area 2230. In an exemplary embodiment, the selected compressed page data of the swap victim buffer area 2230 is overwritten by a swap target page by a lazy swapping operation.

In operation S870, the SVB information is updated. For example, the application processor 2100 updates the SVB information such that information on compressed page data swapped is deleted.

For example, the application processor 2100 manages the SVB information using an SVB descriptor table 2161 of the SRAM 2160 of FIG. 11 and log information.

Figure 16:
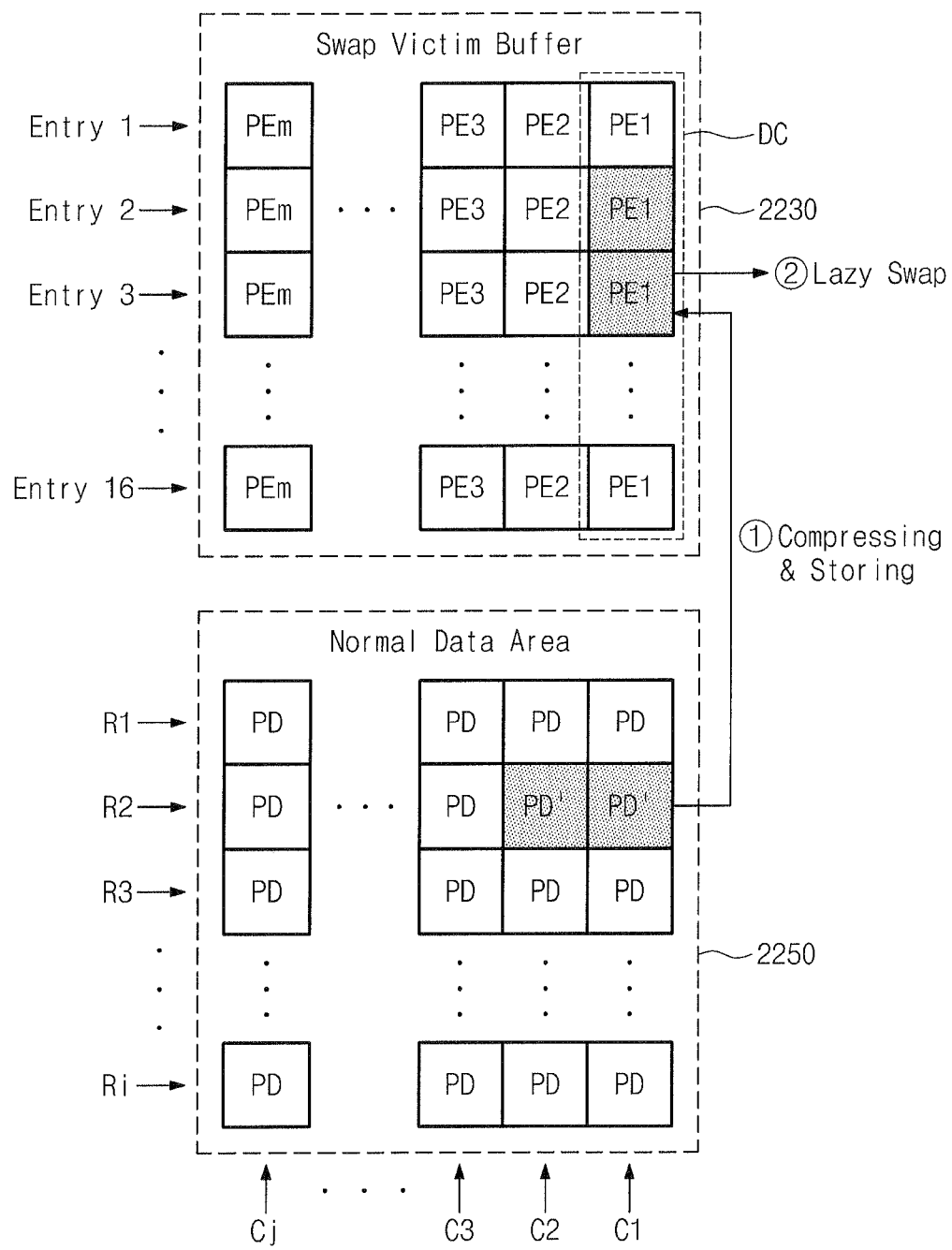

FIGS. 15 and 16 are diagrams illustrating examples of an instant swapping operation and lazy swapping operation according to an exemplary embodiment of the inventive concept. In FIGS. 15 and 16, the normal data area 2250 of FIG. 11 may be configured to store a plurality of page data PD. For ease of description, the normal data area 2250 is illustrated in a matrix form having a plurality of rows R1 to Ri and a plurality of columns C1 to Cj.

Referring to FIG. 15, page data PD' at the third row R3 and first and second columns C1 and C2 of the normal data area 2250 is selected as an instant swap target. The selected page data PD' is shifted to the flash memory 2300. Afterwards, the selected page data PD' is allocated to a new process of the application processor 2100.

Referring to FIG. 16, page data PD' at the second row R2 and first and second columns C1 and C2 of the normal data area 2250 is selected as a lazy swap target. The selected page data PD' is compressed, and the compressed page data is shifted to the swap victim buffer area 2230. For example, the compressed page data is stored at second and third entries Entry2 and Entry 3 as page entries. In this case, the application processor 2100 may reduce the number of a swapping operation to the flash memory 2300 and thus may increase system performance.

Afterwards, if a swap condition of the swap victim buffer area 2230 is satisfied, the compressed page data is shifted to the flash memory 2300 through a lazy swapping operation. For example, if the compressed page data forms a data chunk DC as compressed page data earliest stored at the swap victim buffer area 2230, the compressed page data is swapped to the flash memory 2300 through a lazy swap.

FIG. 17 is a flow chart illustrating a swapped page data recovering method. Referring to FIGS. 10 and 17, in operation S910, whether swapped page data is required is determined. For example, in the event that either an operating system or application driven on a mobile device 2000 accesses swapped page data, a swapped page is required. If a swapped page is not required, the method is ended. If a swapped page is required, the method proceeds to operation S920.

In operation S920, whether the swapped page data is page data having a lazy type is determined. For example, an application processor 2100 determines whether the swapped page data is page data having a lazy type using the log information stored in the SRAM 1160.

If the swapped page data is not page data having a lazy type, that is, the swapped page data is page data having an instant type, in operation S930, requested page data is read from a flash memory 2300, and the read page data is stored at a normal data area 2250. At this time, the requested page data is deleted from the flash memory 2300. Page data having an instant type is page data instantly swapped to the flash memory 2300. Thus, the requested page data is recovered by reading the requested page data from the flash memory 2300 and storing the requested page data read at the normal data area 2250.

If the swapped page data is not page data having a lazy type, in operation S940, whether the requested page data is stored at a swap victim buffer area 2230 is determined. As described above, page data having a lazy type is stored at the swap victim buffer area 2230, and is maintained until a swap condition of the swap victim buffer area 2230 is satisfied. Thus, a method of recovering the requested page data varies according to whether the requested page data is stored at a swap victim buffer area 2230.

In the event that the requested page data is not stored at a swap victim buffer area 2230, the requested page data exists in the flash memory 2300. Thus, in operation S950, the requested page data is read from the flash memory 2300, and the read page data is decompressed. The decompressed page data is stored in the normal data area 2250. The requested page data (i.e., compressed page data) is deleted from the flash memory 2300.

In the event that the requested page data is not stored at a swap victim buffer area 2230, in operation S960, the requested page data exists in the flash memory 2300. Thus, in operation S950, the requested page data is read from the swap victim buffer area 2230, and the read page data is decompressed. The decompressed page data is stored in the normal data area 2250. At this time, the requested page data (i.e., compressed page data) is deleted from the swap victim buffer area 2230. Afterwards, in operation S970, swap victim buffer information and entries of the swap victim buffer area 2230 is updated.

A swapping operation may cause thrashing. Thrashing occurs when the mobile device 2000 excessively consumes a resource to swap page data and to recover swapped page data (i.e., paging).

In an exemplary embodiment of the inventive concept, compressed page data is stored in the swap victim buffer area 2230 of the DRAM 2200 during a predetermined time before being swapped to the flash memory 2300. Thus, the likelihood of thrashing is reduced and the performance of the mobile device 2000 is increased. Also, data stored in the swap victim buffer area 2230 is swapped by the DMA 2130. The DMA consumes less power than the application processor 2100. Thus, power consumption of the mobile device 2000 is reduced. Also, when the application processor 2100 copies data, the copied data is stored at a cache memory of the application processor 2100. If data is copied by the DMA, the copied data need not be stored in the cache memory of the application processor 2100. Thus, the DMA avoid contamination of the cache memory of the application processor 2100 in a swapping operation, and the performance of the mobile device 2000 is increased.

While the present inventive concept has been shown and described with reference to exemplary embodiments thereof, it will be apparent to those of ordinary skill in the art that various changes in form and detail may be made therein without departing from the spirit and scope of the inventive concept as defined by the following claims.

What is claimed is:

1. A mobile device, comprising:
a storage configured to store data;
a buffer memory configured to include a swap victim buffer area and a normal data area; and
an application processor configured to select page data to be swapped from the normal data area and to perform a swapping operation on the selected page data,
wherein the swapping operation performs an instant swapping operation where the page data is shifted from the normal data area to the storage or a lazy swapping operation where the page data is shifted from the normal data area, through the swap victim buffer area, to the storage according to a data type of the selected page data.

2. The mobile device of claim 1, wherein for the lazy swapping operation, the application processor is configured to compress the page data, to store the compressed page data in the swap victim buffer area, and to shift the compressed page data to the storage.

3. The mobile device of claim 2, wherein the storage is a flash memory and the buffer memory is a DRAM.

4. The mobile device of claim 2, wherein when the compressed page data stored in the swap victim buffer area is required, the application processor is configured to read the compressed page data stored in the swap victim buffer, to decompress the compressed page data, and to store the decompressed data in the normal data area.

5. The mobile device of claim 1, wherein for the instant swapping operation, the application processor is configured to shift the page data from the normal data area to the storage without using the swap victim buffer area.

6. The mobile device of claim 5, wherein when a compression ratio of the selected page data is lower than a threshold value, the application processor is configured to perform the instant swapping operation.

7. A mobile device, comprising:
a nonvolatile memory;
a DRAM configured to include a swap victim buffer area and a normal data area; and
an application processor coupled to the nonvolatile memory and the DRAM,
wherein when a swap of page data stored in the normal data area is required, the application processor is configured to perform an instant swapping operation or a lazy swapping operation according to a type of the page data,
wherein the instant swapping operation shifts the page data to the nonvolatile memory without using the swap victim buffer, and wherein the lazy swapping operation compresses the page data and shifts the compressed data to the nonvolatile memory through the swap victim buffer area.

8. The mobile device of claim 7, wherein the application processor determines a type of the page data according to a compression ratio of the page data.

9. The mobile device of claim 7, wherein the application processor comprises a direct memory access configured to shift the compressed page data stored in the swap victim to the nonvolatile memory.

10. The mobile device of claim 7, wherein the compressed page data is shifted in a unit of a data chunk from the swap victim buffer area to the nonvolatile memory.

11. The mobile device of claim 10, wherein the unit of the data chunk is set such that a data transfer time of the data chunk by a direct memory access (DMA) is equal to or shorter than a data transfer time of the data chunk by the application processor, wherein the data transfer time of the data chunk by the direct memory access includes a programming time of the DMA.

12. The mobile device of claim 10, wherein the unit of the data chunk has a size of 32 KB or more.

13. A data managing method of an application processor, comprising:
   determining a data type of page data stored in a normal data area of a DRAM; and
   performing a lazy swapping operation on the page data when the determined data type is a lazy type and an instant swapping operation on the page data when the determined data type is an instant type.

14. The data managing method of claim 13, wherein the determining a data type of page data stored at a DRAM comprises:
   compressing the page data;
   determining a compression ratio of the page data; and
   deciding a data type of the page data as the lazy type when the compression ratio of the page data is higher than a threshold value and as the instant type when the compression ratio of the page data is not higher than the threshold value.

15. The data managing method of claim 14, further comprising:
   storing the data type of the page data.

16. The data managing method of claim 13, further comprising:
   predicting the data type of the page data using header information of the page data; and
   when the data type is the lazy type, performing a compression operation on the page data; and
   when the data type is not the lazy type, skipping the compression operation on the page data.

17. The data managing method of claim 14, further comprising:
   storing the compression ratio of the page data.

18. The data managing method of claim 17, further comprising:
   reading the stored compression ratio; and
   if the read compression ratio is higher than the threshold value, reading the page data from the DRAM to compress the read page data, and wherein if the read compression ratio is not higher than the threshold value, compression of the page data is skipped.

19. The data managing method of claim 13, further comprising:
   detecting a feature of the page data or a process associated with the page data; and
   varying the threshold value according to the detection result.

20. The data managing method of claim 13, wherein the determining of the data type of page data stored in the DRAM comprises:
   compressing part of the page data;
   determining whether a compression ratio of the part of the page data is higher than a threshold value; and
   when the compression ratio is higher than the threshold value, compressing the remaining of the page data and deciding the data type as the lazy type; and
   when the compression ratio of the page data is not higher than the threshold value, deciding the data type as the instant type without compressing the remaining of the page data.

21. The data managing method of claim 13, wherein the instant swapping operation further comprises:
   shifting the page data from the DRAM to a storage.

22. The data managing method of claim 13, wherein the lazy swapping operation comprises:
   shifting the page data to a swap victim buffer area of the DRAM in a compressed data format.

23. The data managing method of claim 22, wherein the swap victim buffer area is configured to include a plurality of entries, each of which is configured to have a plurality of page entries, wherein the page data is stored in a page entry of the plurality of the entries, wherein the page data is stored in the compressed data format.

24. The data managing method of claim 23, wherein the plurality of page entries of each of the plurality of entries is managed using a linked list.

25. The data managing method of claim 23, wherein the lazy swapping operation further comprising:
   shifting the compressed page data from the swap victim buffer area to a storage.

26. The data managing method of claim 25, wherein the compressed page data is selected when the compressed page data is earliest stored in the swap victim buffer area.

27. The data managing method of claim 26, further comprising:
   reading compressed page data from the plurality of entries when the compressed page data stored at the swap victim buffer area is required;
   decompressing the compressed page data; and
   storing the decompressed page data in the normal data area.

28. The data managing method of claim 13, wherein the lazy swapping operation performed using a direct memory access and the instant swapping operation is performed by a processor.

29. An application processor, comprising:
   a DRAM interface;
   a flash memory interface;
   a direct memory access; and
   a processor configured to determine whether a swapping operation is required, configured to receive page data to be swapped through the DRAM interface, and configured to perform the swapping operation on the page data in an instant swapping operation or a lazy swapping operation according to a data type of the page data,
   wherein in the lazy swapping operation, the processor is configured to compress the page data and output the compressed page data through the DRAM interface and the direct memory access is configured to control a data path between the DRAM interface and the flash memory interface to shift the outputted compressed page data from the DRAM interface to the flash memory interface.

30. The application processor of claim 29, wherein the data type of the page data is determined by a compression ratio of the page data.

31. The application processor of claim 29, wherein the data type of the page data is determined by header information of the page data without compressing the page data.

32. The application processor of claim 29, wherein the instant swapping operation is performed without compressing the page data.

* * * * *